No. 710,287. Patented Sept. 30, 1902.
E. LOTTIER.
PRODUCTION OF PLASTIC ARTICLES.
(Application filed Mar. 24, 1902.)
(No Model.)
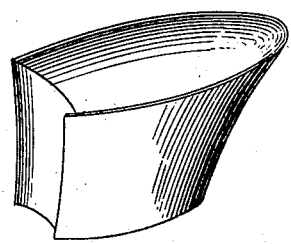
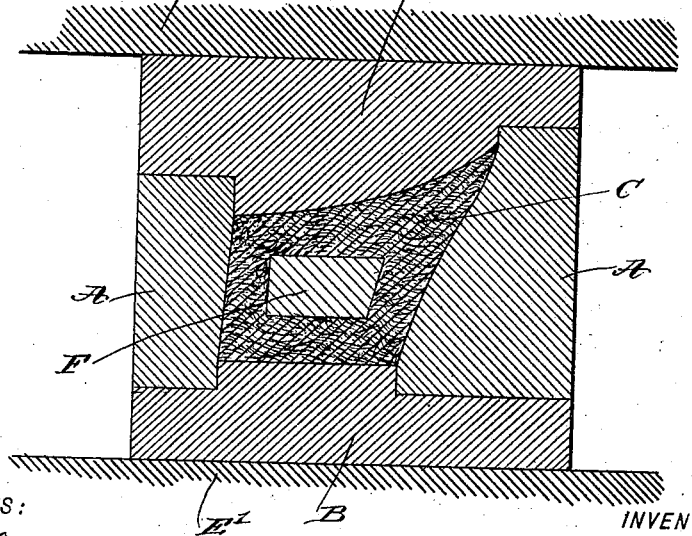
WITNESSES:
INVENTOR
Ernest Lottier
BY
ATTORNEYS

UNITED STATES PATENT OFFICE.

ERNEST LOTTIER, OF WEST HOBOKEN, NEW JERSEY.

PRODUCTION OF PLASTIC ARTICLES.

SPECIFICATION forming part of Letters Patent No. 710,287, dated September 30, 1902.

Application filed March 24, 1902. Serial No. 99,684. (No specimens.)

*To all whom it may concern:*

Be it known that I, ERNEST LOTTIER, a citizen of the United States, and a resident of West Hoboken, in the county of Hudson and State of New Jersey, have invented new and useful Improvements in the Production of Plastic Articles, of which the following is a full, clear, and exact description.

The object of the invention is to provide certain new and useful improvements in the production of plastic articles, such as boot and shoe heels and various other articles heretofore mainly formed of leather and like material.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a perspective view of a shoe-heel made from a composition of matter, as hereinafter more fully shown and described; and Fig. 2 is a sectional side elevation of the mold and press for forming the article.

The improved composition of matter of which the article is formed consists, essentially, of the following ingredients combined in about the proportions stated—namely, silk fiber, one ounce, and dissolved shellac, two ounces. In practice I employ waste silk, such as comes from silk spinning and weaving establishments, and this waste silk is mixed with equal parts of shellac and alcohol to form a mass of about the consistency of molasses. The mass is placed in a mold having the configuration of the article to be produced and this mass is subjected in the mold to heavy pressure by pressing some of the mold members and applying at the same time heat to the mold. The mass in the mold is readily compressed and sets very quickly to form the article.

The mold (shown in Fig. 2) consists, essentially, of the sides A, set on a bottom B, and into this mold is placed the mass C, and then the cover D is placed on the top of the sides A, and the closed mold is now placed between the members E and E' of a press of any approved construction. Now by moving the members E and E' toward each other the cover D is pressed down until it is seated on the sides A of the mold and the said cover in moving downward compresses the mass C to give the desired shape to the article and at the same time set the ingredients of the mass very firmly. The mold is slightly heated during the compressing of the mass by suitable means, and the whole operation is completed in about five minutes. The mold is then removed from the press and is opened to release the finished article.

In order to cheapen the article, I may place a piece of wood F or other light material in the middle of the mass on filling the latter into the mold, thus requiring a less quantity of the mass for forming the article.

The article produced is very durable and can be readily nailed or otherwise fastened in position on the boot or shoe.

Having thus described my invention, I claim as new and desire to secure by Letters Patent—

1. An article, consisting of waste silk, shellac, and alcohol mixed together in about the proportions specified and pressed into form while subjected to heat, as set forth.

2. As a new article of manufacture, a boot or shoe heel formed of silk fiber and dissolved shellac, molded into form, as set forth.

3. As a new article of manufacture, a boot or shoe heel formed of silk fiber, shellac and alcohol in about the proportions specified, molded into form while subjected to heat, as set forth.

4. As a new article of manufacture, a boot or shoe heel formed of silk fiber and dissolved shellac, molded into form around a central wooden core, as set forth.

In testimony whereof I have signed my name to this specification in the presence of two subscribing witnesses.

ERNEST LOTTIER.

Witnesses:
JOHN JOSEPH BROWN,
ANTOINE PELISSIER.